United States Patent
Vogt et al.

(10) Patent No.: US 6,856,457 B2
(45) Date of Patent: Feb. 15, 2005

(54) SINGLE AND MULTI-APERTURE, TRANSLATIONALLY-COUPLED CONFOCAL MICROSCOPE

(75) Inventors: William I. Vogt, Baraboo, WI (US); Michael J. Szulczewski, Middleton, WI (US); Donald J. Wolf, Madison, WI (US)

(73) Assignee: Prairie Technologies, Inc., Middleton, WI (US)

( * ) Notice: Subject to any disclaimer, the term of this patent is extended or adjusted under 35 U.S.C. 154(b) by 12 days.

(21) Appl. No.: 10/109,340

(22) Filed: Mar. 26, 2002

(65) Prior Publication Data

US 2002/0141051 A1 Oct. 3, 2002

Related U.S. Application Data

(60) Provisional application No. 60/279,067, filed on Mar. 27, 2001.

(51) Int. Cl.[7] .............................................. G02B 21/06
(52) U.S. Cl. ........................ 359/389; 359/368; 359/738
(58) Field of Search ................................. 359/385, 368, 359/389, 738, 739, 740

(56) References Cited

U.S. PATENT DOCUMENTS

| | | | |
|---|---|---|---|
| 3,517,980 A | 6/1970 | Petran et al. | 359/389 |
| 4,802,748 A | 2/1989 | McCarthy et al. | 359/368 |
| 5,452,125 A * | 9/1995 | White et al. | 359/368 |
| 6,028,306 A * | 2/2000 | Hayashi | 250/235 |
| 6,191,885 B1 | 2/2001 | Kitagawa | 359/368 |
| 6,204,962 B1 | 3/2001 | Kawamura | 359/368 |
| 6,525,828 B1 * | 2/2003 | Grosskopf | 356/613 |

* cited by examiner

*Primary Examiner*—Thong Nguyen
*Assistant Examiner*—Arnel C. Lavarias
(74) *Attorney, Agent, or Firm*—Joseph T. Leone, Esq.; DeWitt Ross & Stevens S.C.

(57) ABSTRACT

Disclosed are microscopes, preferably confocal microscopes, that include aperture plates having one or more arrays of apertures defined therein. The aperture plate is disposed in a position within an incoming light beam such that the incoming light beam is spatially filtered as it passes through the array of apertures. In certain embodiments of the invention, the aperture plate is fixed and immovable, in others, the aperture plate is translatable within a plane of confocality.

5 Claims, 9 Drawing Sheets

SINGLE AND MULTI-APERTURE, TRANSLATIONALLY-COUPLED CONFOCAL MICROSCOPE

Priority is hereby claimed to provisional patent application Ser. No. 60/279,067, filed Mar. 27, 2001, and incorporated herein by reference.

FIELD OF THE INVENTION

The invention is directed to confocal microscopes and sub-assemblies used in confocal microscopes. In one embodiment of the invention, the confocal microscope includes a fixed, single or multi-aperture array, and a sub-assembly for quickly gathering sharply-focused scanned images of a sample. In another embodiment of the invention, the confocal microscope includes a single or multi-aperture array that is translatable in the X and Y planes.

BACKGROUND

Confocal microscopes are well known devices. The basic elements of a confocal microscope are illustrated schematically in FIG. 1. In FIG. 1, a light source 1, such as a high-intensity lamp, laser, or light-emitting diode, generates a light beam that passed through a pinhole 2, through dichroic mirror 3, and through objective lens 12, thus forming a spot of focused light on the surface of a sample 10. The objective lens 12 is an aberration-corrected lens.

Light reflected from the surface of the sample 10 (or light generated by a fluorescent or chromophoric dye present in the sample) passes back through the objective lens 12, and is reflected by the dichroic mirror 3 and focused. A pinhole 5 is disposed at the focal point. The focused light coming from the sample, having passed through the pinhole 5, is detected by a photodetector 26.

In a conventional scanning confocal microscope, the sample 10 is rasterized to generate a two-dimensional image of the surface of the sample. To scan the light path across the sample systematically (to thereby generate the rasterized image), a conventional confocal microscope uses a sub-assembly of galvanometers or acousto-optical scanners to manipulate the light path in the X and Y directions. Generally, when using the conventional arrangement shown in FIG. 1, and using galvanometers to scan the light path, the image acquisition rate is about 1 image/sec. If a combination of acousto-optical and galvanometers are used to scan the image, the image acquisition rate is about 30 images/sec. These image acquisition rates limit the usefulness of confocal microscopy because generating a complete image of the sample is too slow.

In an effort to simplify the instrumentation and to speed the image acquisition rate, confocal microscopes wherein the pinhole 5 of FIG. 1. is replaced by a spinning disk having a plurality of apertures passing therethrough are known. In these "rotating disk" confocal microscopes, the single pinhole 5, is replaced by a rotating disk having a pattern of annular apertures therein, the pattern arranged in the shape of an Archimedean spiral. The apertures that are diametrically opposite one another on the disk are on identical radii, and the pattern as a whole has a central symmetry. This type of disk is generally known as a Nipkow disk. Nipkow disks have conventionally been fabricated from a copper foil sheet stretched over a retaining ring and having holes etched into the copper sheet. See, for example, U.S. Pat. No. 4,802,748, issued Feb. 7, 1989, to McCarthy et al.; see also U.S. Pat. No. 3,517,980, issued Jun. 30, 1970, to Petran et al.

For other examples of confocal microscopes utilizing a Nipkow disk, see, for example, U.S. Pat. No. 6,191,885 to Kitagawa, issued Feb. 20, 2001, and U.S. Patent No. 6,204,962 to Kawamura, issued Mar. 20, 2001. These two patents describe a multi-beam optical arrangement wherein a rotating disk scanner is used to scan the laser beam across the sample being viewed. The most significant feature of this type of confocal microscope is that it enables direct observation and direct photography of the sample. In short, this type of multi-beam confocal microscope can be used in the same fashion as a conventional light microscope.

Spinning disk confocal microscopes, however, have several design limitations. Absent complicated realignment of the system, spinning disk confocal microscope designs are restricted to using a single confocal aperture size. Several designs are vulnerable to back-reflection of the excitation light; that is, these designs are prone to having excitation light "leak" into the detection pathway. This is especially so when such a spinning disk device is used in reflected light mode. All disk scanners are limited to using a two-dimensional detector array, such as a CCD camera, to capture the image information. Given these design limitations of the prior art disk scanning confocal instruments, there exists several unmet needs for an instrument that combines the speed and simplicity of the disk scanning devices with the flexibility of the laser scanning systems.

SUMMARY OF THE INVENTION

In a first embodiment, the invention is directed to a microscope, preferably a confocal microscope, which comprises a light source for emitting an incoming light beam with which a sample to be observed is irradiated, thereby generating a return light beam from the sample. A fixed and immovable aperture plate having an array of apertures defined therein is disposed in a position within the incoming light beam such that the incoming light beam is spatially filtered as it passes through the array of apertures. A first means for scanning the spatially-filtered incoming light beam from the aperture plate across the sample and for scanning the return light beam from the sample across the aperture plate.

Another embodiment of the invention is directed to a microscope as described in the preceding paragraph, with the exception that the aperture plate is translatable within a plane of confocalility and the aperture plate has at least two apertures defined therein. Here, the aperture plate is disposed in a position within the incoming light beam such that the incoming light beam passes through a first of the at least two apertures and the return light beam passes through a second of the at least two apertures.

Yet another embodiment of the invention is directed to a microscope as described in the preceding paragraph, where aperture plate translatable within a plane of confocalility, and further wherein the aperture plate has at least two distinct arrays of apertures defined therein; wherein a first of the arrays of apertures is disposed within the incoming light beam such that the incoming light beam is spatially filtered as it passes through the first array of apertures; and wherein a second of the arrays of apertures is disposed within the return light beam such that the return light beam is spatially filtered as it passes through the second array of apertures. This embodiment of the invention further includes a first means for scanning the spatially-filtered incoming light beam from the aperture plate across the sample and for scanning the return light beam from the sample across the aperture plate. The first means for scanning may be selected from the group consisting of a galvanometer-controlled mirror, an acousto-optical deflector, a polygonal scanner, a diffraction grating, and a microelectromechanical system.

A still further embodiment of the invention is directed to a microscope having two distinct light paths, an incoming light path and a targeting light path, and beam splitting means for causing these light paths to be optically-coupled and co-linear. Specifically, this embodiment of the invention is directed to a microscope comprising a first light source for emitting an incoming light beam with which a sample to be observed is irradiated, thereby generating a return light beam from the sample; and a second light source for emitting a targeting light beam distinct from the incoming light beam. An aperture plate translatable within a plane of confocalility and having at least two apertures defined therein is disposed in a position within the incoming light beam and the targeting light beam such that the incoming light beam passes through a first of the at least two apertures and the targeting light beam passes through a second of the at least two apertures. Beam splitting means disposed within the incoming light beam, the targeting light beam, and the return light beam, then functions to split the light beams such that the incoming light beam is directed toward the target, the targeting light beam and the return beam from the sample are directed toward an eyepiece or photodetection means, and the incoming light beam, the targeting light beam, and the return light beam are co-linear and optically-coupled. In this fashion, the user of the device can use the targeting light beam to locate a desired portion of the sample to be illuminated using the incoming light beam. When the desired target location is identified, the incoming light beam can then be activated. This embodiment of the invention is particularly suitable for fluorescent microscopy, where the targeting light beam is preferably a visible light beam, and the incoming light beam is at the fluorescent excitation wavelength, normally in the UV range.

Further aims, objects, and advantages of the subject invention are described in the Detailed Description and attached drawing figures.

DETAILED DESCRIPTION OF THE INVENTION

Figure 1:
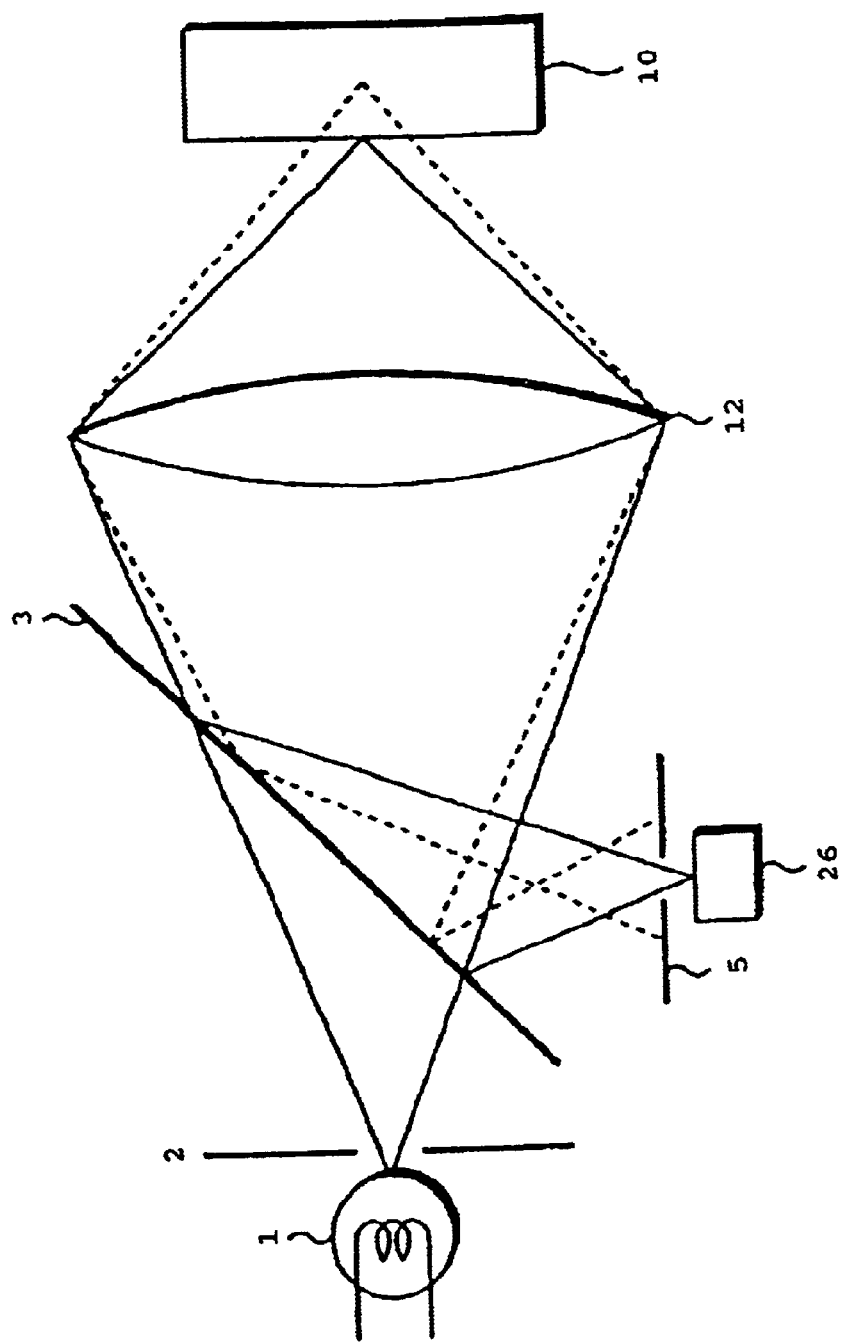
FIG. 1 is a schematic representation of the light path of a prior art confocal microscope.

Referring to the drawing figures, where similar reference numbers indicate similar or identical features throughout the drawings, the invention is drawn to a confocal microscope that utilizes, in one embodiment, a fixed array of apertures 20 to discriminate between in-focus images and out-of-focus images.

Figure 2:
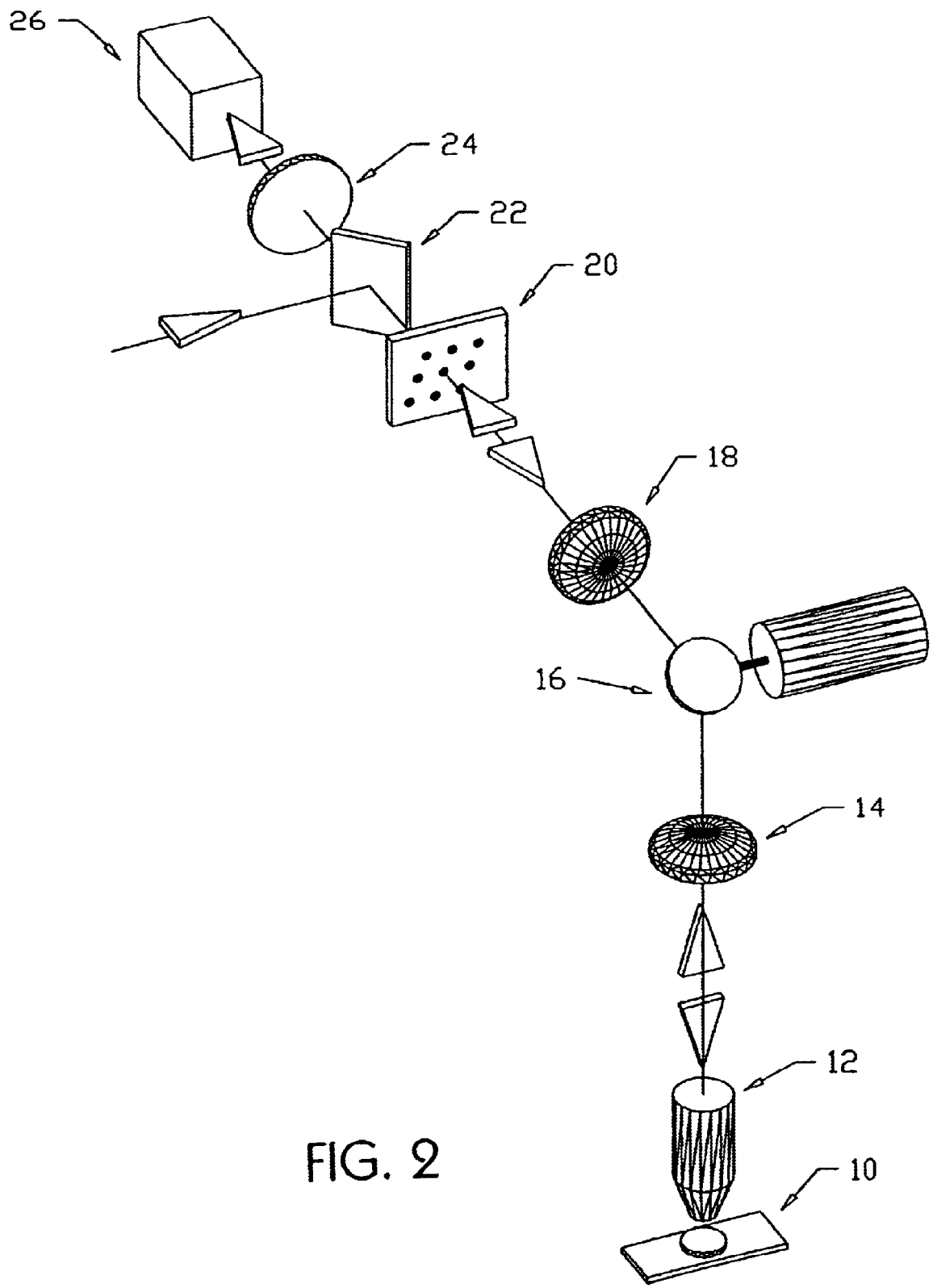
FIG. 2 is a schematic representation of a first embodiment of the present invention having one galvanometer, one fixed, multi-aperture array, and a non-scanned multi-channel detector.

Referring now to FIG. 2, which shows a first embodiment of the confocal microscope, the entire assembly includes an objective lens (or lenses) 12, a transfer lens (or lenses) 14, a galvanometer-driven mirror 16, a transfer lens (or lenses) 18, an aperture plate 20 having a fixed array of transparent "apertures" passing therethrough, a dichroic mirror (or mirrors) 22, an image transfer lens (or lenses) 24, and a photodetector 26.

In operation, the embodiment shown in FIG. 2 functions as follows: Light from a light source (not shown, but preferably a laser light source) reflects off the dichroic mirror 22, is spatially filtered at the aperture plate 20, passes through the transfer lens 18, and is reflected off the galvanometer-controlled mirror 16. The light then passes through the transfer lens 14, the objective lens 12, and impinges on the sample to be imaged 10.

In the discussion that follows, several mirrors are described as "galvanometer-controlled." This is for sake of brevity and clarity only. There are many different means to deflect a light path, such as acousto-optical deflectors, polygonal scanners, diffraction gratings, microelectromechanical systems (MEMS) and the like. All of these devices are encompassed by the present invention and can be used in place of the galvanometer-controlled mirrors explicitly depicted in the drawing figures. Collectively, these devices or any combination of these devices is referred to herein as "means for scanning the light path."

Reflected and/or fluorescent light from the sample then follows the reverse path of the incoming light path to the point of the dichroic mirror 22. Of critical importance in this embodiment of the subject invention is the provision of the aperture plate 20 having a fixed array of transparent apertures therein. In conjunction with the means for scanning the light path (i.e., galvanometer-controlled mirror 16 in FIG. 2), the aperture plate 20 allows a sample to be scanned quickly and the data presented to the multi-channel detector for assembly into a finished image. The galvanometer is controlled in such a fashion that the incoming light is swept as a multitude of spots across the surface of the sample 10. The returning image is simultaneously de-scanned via the same galvanometer and then spatially filtered as the light returns back through the fixed array of transparent apertures in the aperture plate 20. Thus, in this embodiment of the invention, the galvanometer, 16 acts as both a means for scanning spatially-filtered light exiting the aperture plate across the sample and as a means for scanning light returning from the sample across the aperture plate. The fixed array of apertures is dimensioned and configured so that the apertures in the array are situated at points where focused light only can pass through the apertures. Out-of-focus light impinges upon the opaque portions of the aperture plate 20 and thus is not passed on to the detector.

After passing through the array 20, light returning from the sample passes through the dichroic mirror 22, passes through the image transfer lens 24 and is detected and formed into a visible image by the photodetector 26. By using the galvanometer 16 to scan both the input light and the reflected and/or fluorescent light from the sample, high-quality, sharply-focused images can be obtained far faster than when using a conventional confocal microscope having a single pin-hole.

In terms of fabrication of the individual components illustrated in FIG. 2, all of the lenses, mirrors, galvanometers, and detectors are of conventional design. Their assembly into the confocal microscopes described herein is, however, novel. The aperture plate 20, is preferably fabricated from glass or other transparent material and which is coated with an opaque material in the areas that are to be light-tight. Thus, the "apertures" in the preferred embodiment are not true voids in the aperture plate, but are areas that are transparent to the wavelengths of light being used. The aperture plate 20 may, however, be fabricated from a billet of opaque material, with the apertures actually being true voids in the billet. This approach, while encompassed by the present invention, is not preferred.

Where the aperture plate includes an array of apertures, one possible arrangement of the apertures comprises a series of slanted rows such that as the image of the array is swept across the sample each aperture sweeps along a line that is equidistant from the lines swept by adjacent apertures. In this particular arrangement, the array comprises, for example, 86 rows of 12 apertures per row. Within each row, the apertures are spaced 200 $\mu$m on center horizontally, and each is displaced a vertical distance of 16.7 $\mu$m from the preceding aperture in the same row. The rows are then spaced 200 $\mu$m apart vertically. When the image of the array thus formed is swept across the sample, a series of 1024 equidistant lines are scanned across the sample.

This is only one example of many possible array arrangements. The choice of any given array pattern is dictated by the mechanical and optical specifications of the device itself and the use to which the instrument is to be dedicated. For example, the optical magnification of the system between the aperture plate and the sample, the type of eyepiece used, and the type of camera (if any) used, all can be factored into the design of the pinhole array. Where a charge-coupled device (CCD) is used as a detector, the pixel size and array size of the CCD chip is a factor. In certain microscopy applications, the user might not want to scan the complete image, but only a narrow band of the image. In this instance, the array might contain less apertures or only a portion of the pinhole array would be scanned.

Within the aperture array, the individual aperture sizes may be constant or variable. For example, aperture arrays wherein each aperture in the array has diameters of 120 $\mu$m, 60 $\mu$m, and/or 30 $\mu$m have been constructed. In the case where the aperture plate is to be used for confocal imaging, the apertures are sized according to the point spread function of the optical system that relays the light from the aperture to the sample and from the aperture to the photodetection device. In the particular case shown in FIG. 2, the aperture size would be calculated using the diameter of the back aperture of objective lens 12 and the focal length of the telecentric transfer lens 18. Calculating the diameter of the central disk of the Airy diffraction pattern generated by this lens system at the aperture plate 24 and sizing the apertures to one-half of this diameter yields the classical optimum confocal aperture size. See, for example, "Confocal Microscopy," T. Wilson, ed., © 1990 Academic Press, London, ISBN 0-12-757270-8.

Figure 9:
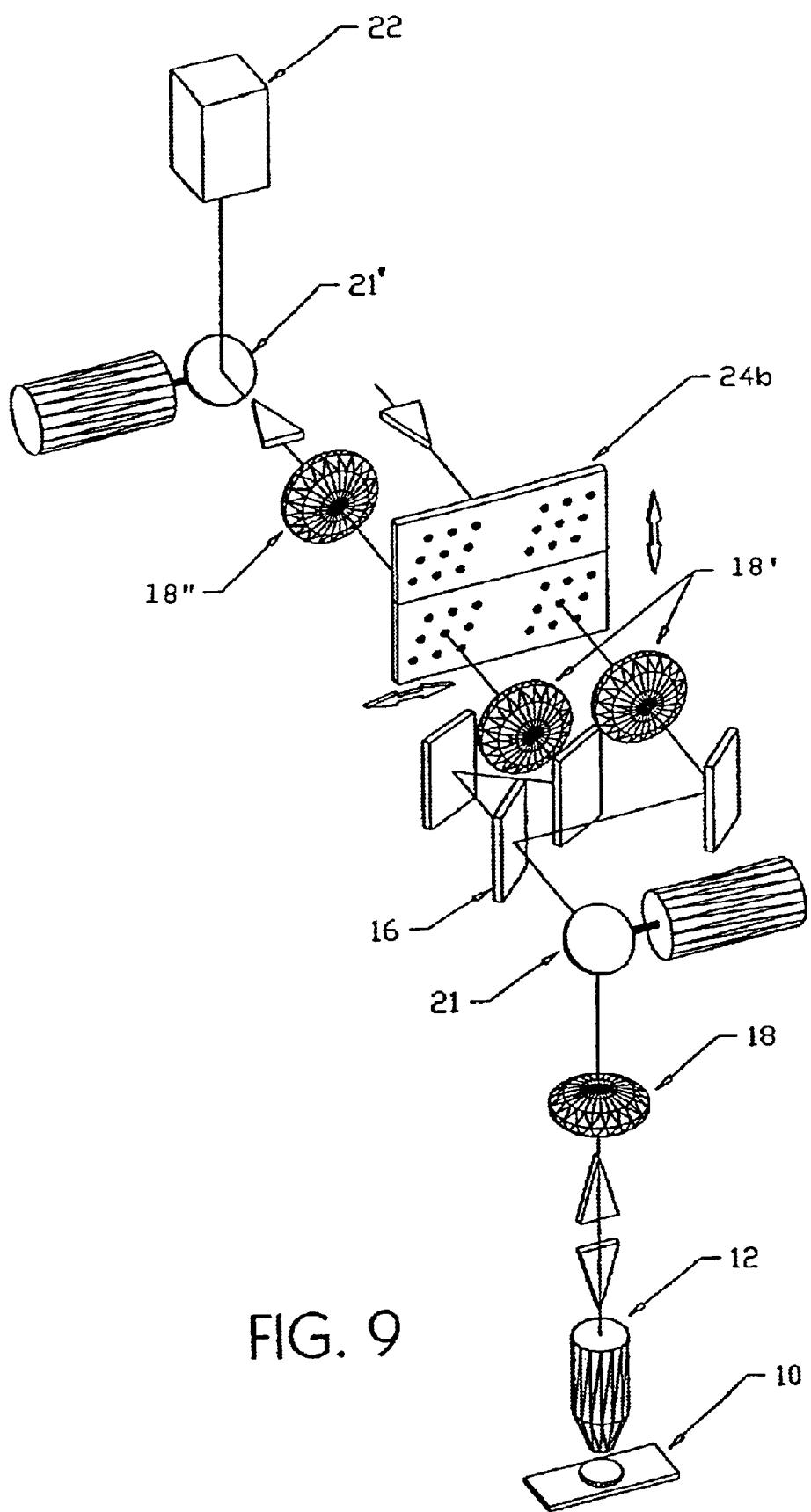
FIG. 9 is a schematic representation of a eighth embodiment of the present invention having a translatable aperture plate including multiple sets of aperture arrays.

In one use of the subject device, fluorescent imaging of biological specimens, it is desirable to compromise the confocal rejection of the out-of-focus light in order to increase the amount of signal detected. In this case it may be advantageous to use a larger aperture size. In this respect, the embodiment of the invention illustrated schematically in FIG. 9 provides means by which several arrays of different aperture size may be brought into the imaging path, thereby providing flexibility in signal detection and confocality selection.

As described below, the aperture plate 20 may also be mounted in such a fashion that it can be translated slightly during successive sweeps to gather images that are infinitely sampled.

Figure 3:
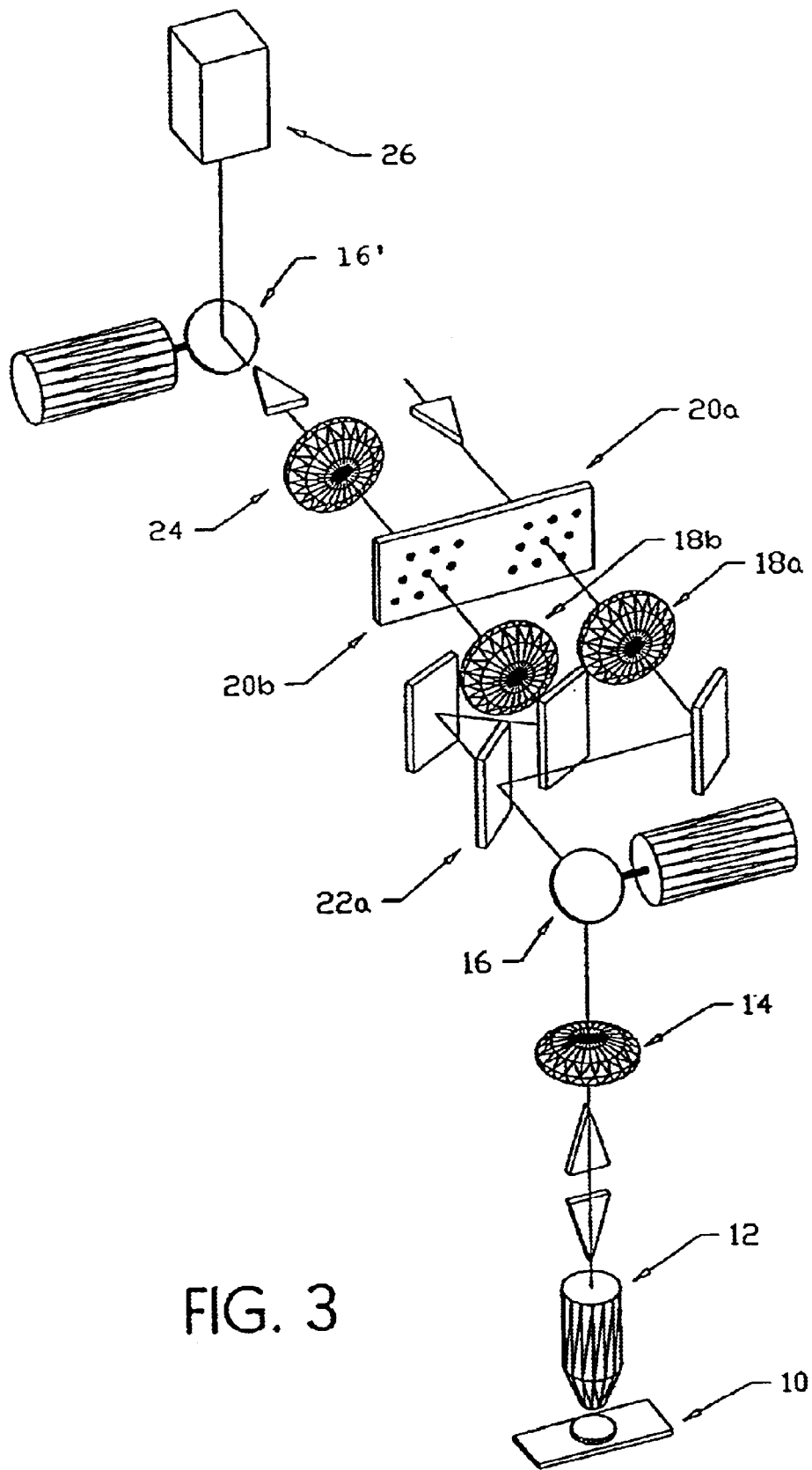
FIG. 3 is a schematic representation of a second embodiment of the present invention having two galvanometers, a dual, fixed, multi-aperture array, and a scanned, multi-channel detector.

A second embodiment of the invention is shown in FIG. 3. This embodiment of the invention functions in largely the same fashion as that shown in FIG. 2, with the exception that the input light path is separated from the returning light path. Separating the input light path from the returning light path has certain advantages: 1) it eliminates back-scattered light from the input light path from reaching the detector; 2) it allows various combinations of input and output aperture sizes to be introduced into the optical path; and 3) it allows for greater flexibility in the wavelength selection both for input light and fluorescent emission wavelengths.

As shown in FIG. 3, light from a light source (not shown, but preferably a laser light source) passes directly through one-half of an aperture plate having dual fixed arrays of apertures 20*a* and 20*b*. The aperture array 20*a* spatially filters the input light path and aperture array 20*b* spatially filters the return light path. The input light passes through transfer lens 18*a*, reflects off the beam-splitter sub-assembly 22*a*, and is then reflected off a first galvanometer-controlled mirror 16. The light then passes through the transfer lens 14, the objective lens 12, and impinges on the sample to be imaged 10.

Reflected and/or fluorescent light from the sample then follows the reverse path of the incoming light path to the point of the beam-splitter sub-assembly 22*a*. At this point, the reflected and/or fluorescent light path is split from the incoming light path as it passes through the dichroic and directed through the transfer lens 18*b* onto the aperture array 20*b*. After passing through the array of apertures 20*b*, the light path is reflected off a second galvanometer-controlled mirror 16' and is then directed to a multi-channel photodetector 26. The two galvanometers are controlled in such a fashion that the incoming light path is swept across the surface of the sample 10 via galvanometer 16, and the return light path is swept across the detector via galvanometer 16'. As in all of the embodiments of the invention, the arrays of apertures (20*a* and 20*b*) are dimensioned and configured so that the apertures in the array are situated at points where focused light only can pass through the apertures. Out-of-focus light impinges upon the opaque portions of the aperture plate and thus is not passed on to the detector.

Figure 4:
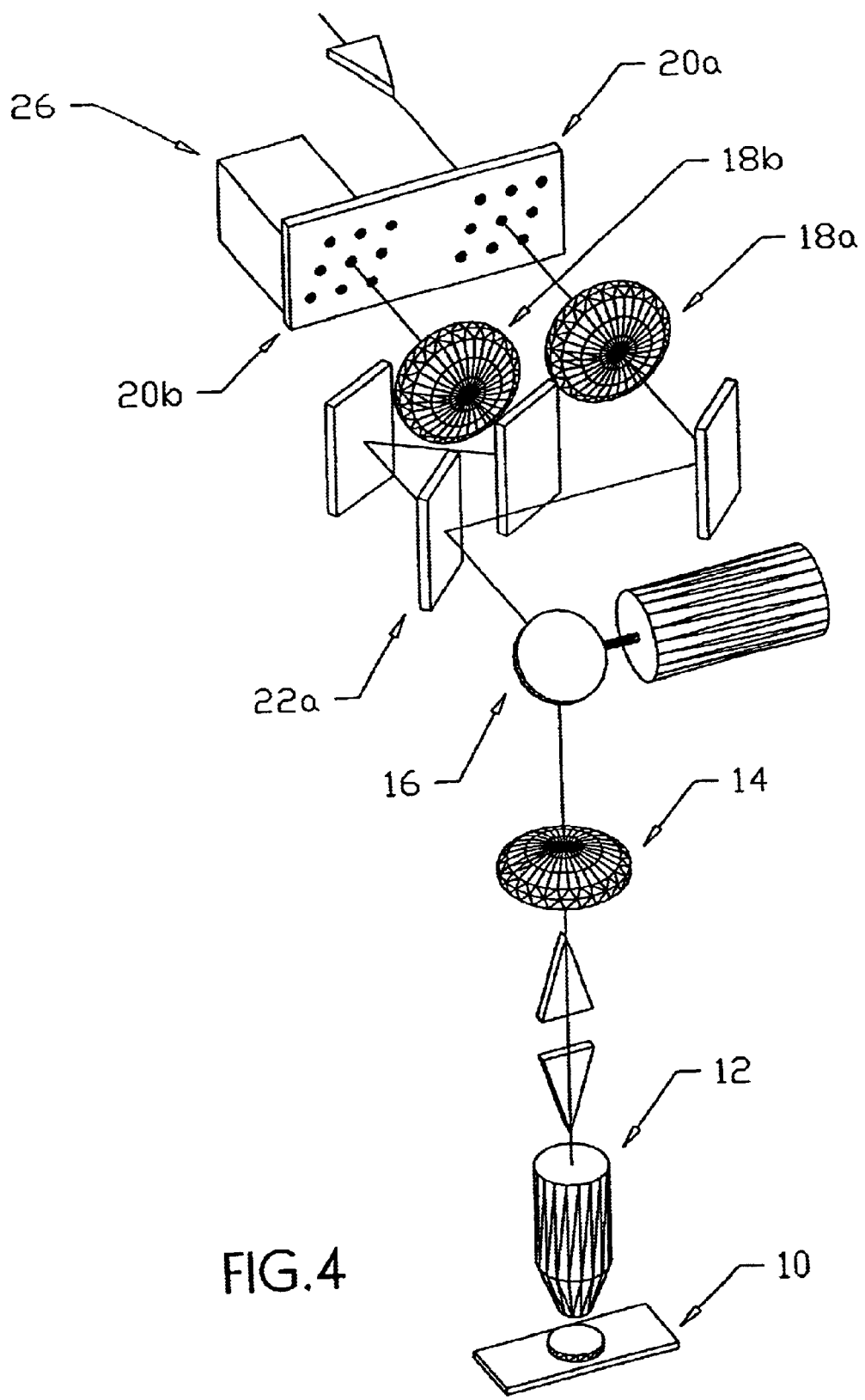
FIG. 4 is a schematic representation of a third embodiment of the present invention having one galvanometer, a dual, fixed, multi-aperture array, and a multi-channel detector situated directly behind the receiving portion of the array.

FIG. 4 illustrates a third embodiment of the invention wherein the photodetector 26 is situated directly behind the dual array of apertures, in the path of the reflected and/or fluorescent light coming from the sample. The operation of the embodiment shown in FIG. 4 is very similar to that shown in FIG. 3, with the exception that the galvanometer 16' has been removed and the detector resituated to gather light directly from the backside of portion 20*b* of the dual array of apertures. Again, as in the embodiment shown in FIG. 4, the input light path is separated from the reflected light path by beam-splitter sub-assembly 22*a*. Also note that the camera array can be used in such a way to eliminate the need for the second array 20b. In other words, the camera array can perform the function of the second aperture array by selectively reading only certain sub-elements of the camera array, thus eliminating the need for a separate and distinct array 20b.

Figure 5:
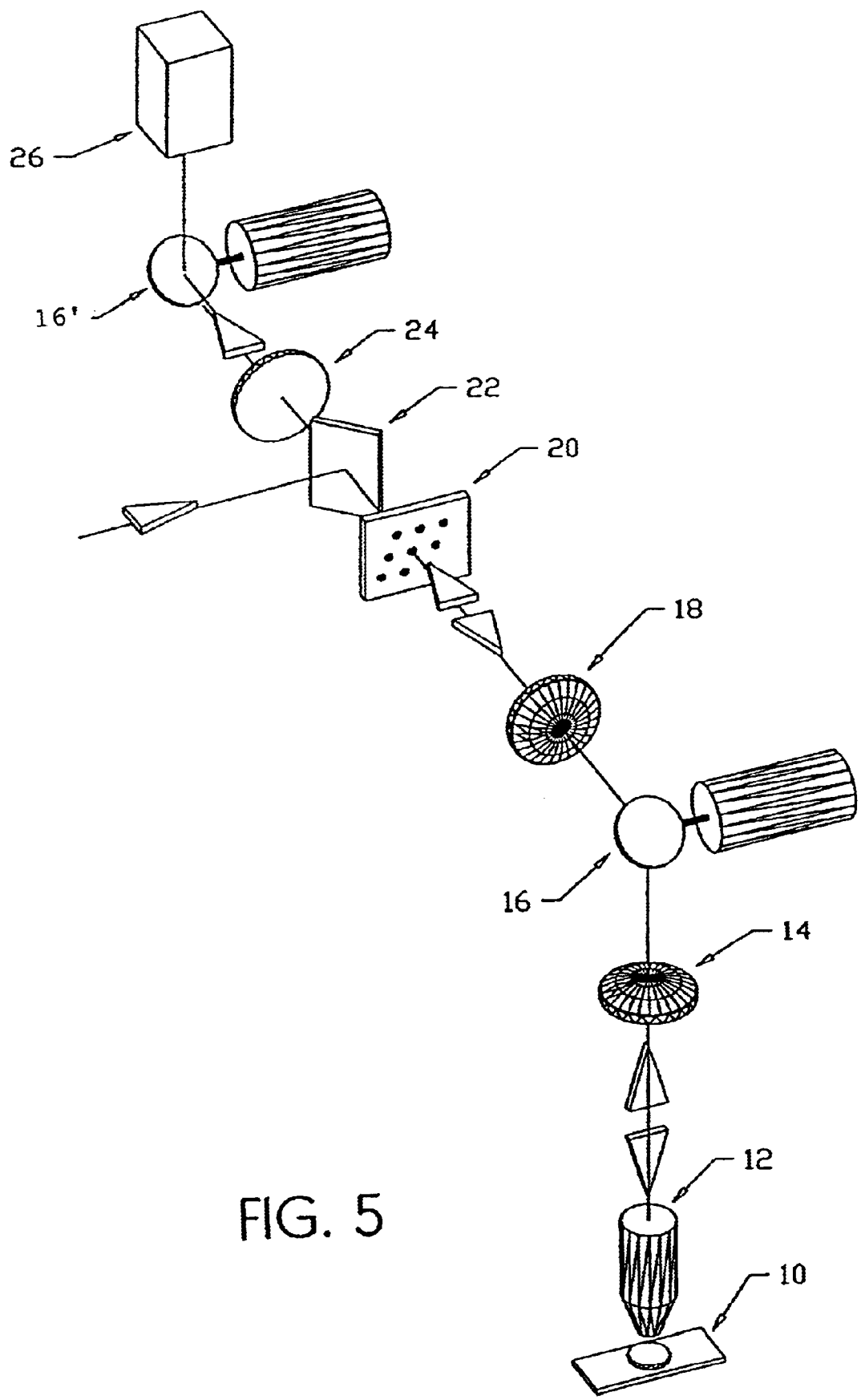
FIG. 5 is a schematic representation of a fourth embodiment of the present invention having two galvanometers, one fixed, multi-aperture array, and a multi-channel detector.

FIG. 5 illustrates a fourth embodiment of the invention wherein the input and reflected light paths are not split. In short, the embodiment illustrated in FIG. 5 is essentially identical to that shown in FIG. 3, with the exception that the dichroic mirror 22 of FIG. 5 is placed in the same relative location as shown in FIG. 2, and the beam splitter 22a of FIG. 3 has been eliminated. Thus, as shown in FIG. 5, an aperture plate 20 having a single, fixed army of apertures is utilized, rather than the dual array shown in FIG. 3. As shown in FIG. 5, two galvanometers, 16 and 16' are utilized. Galvanometer 16 scans the input light source across the sample being imaged, while galvanometer 16' scans the reflected light across the detector.

In each embodiment of the invention as depicted in FIGS. 2 through 5, the aperture plate (20, 20a and 20b) is fixed and immovable. But, as noted above, the aperture plate 20 may optionally be translatable, thereby affording even greater flexibility in how the sample to be imaged is scanned and the resulting data compiled.

Figure 6:
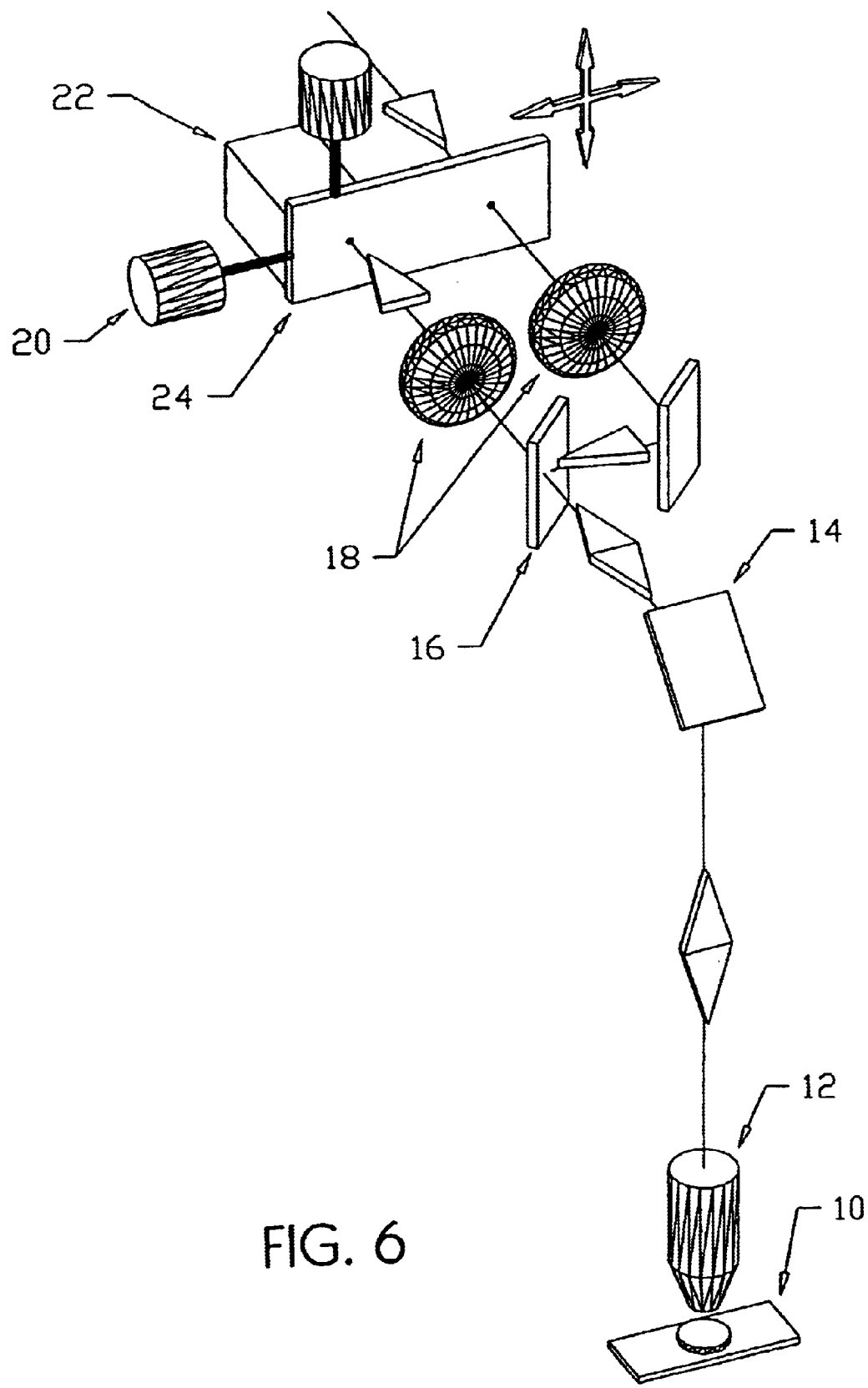
FIG. 6 is a schematic representation of a fifth embodiment of the present invention having a translatable aperture plate including a single pinhole in the incoming light path and a single pinhole in the return light path.

Referring now to FIG. 6, this figure illustrates a fifth embodiment of the invention. This embodiment of the invention includes objective lens 12, mirror 14, dichroic mirror or beam-splitter 16, focusing lens(es) 18, translatable aperture plate 24, means 20 for translating the aperture plate 24, and photodetector 22.

As shown in FIG. 6, the means 20 for translating the aperture plate 24 is a pair of stepper motors operationally connected to the plate 24. Thus, the means 20 allow for the aperture plate 24 to be translated in the X or Y planes, as shown by the arrows in FIG. 6.

In operation, light from a source (not shown) passes through the right-hand aperture in the aperture plate 24, passes through focusing lens 18, and is directed to the sample via a dichroic mirror or beam-splitter 16, mirror 14, and objective lens 12, Light returning from the sample passes through the same elements in reverse order until reaching dichroic mirror or beam-splitter 16. At this point, the returning light is directed through the left-hand focusing lens 18 (as shown in FIG. 6) and then through the left-hand aperture in aperture plate 24. The light is detected in photodetector 22, By translating the aperture plate 24 in a controlled fashion, the incoming light path can be simultaneously scanned across the sample 10 via the right-hand aperture in plate 24, while the return light path is simultaneously de-scanned prior to impinging upon the detector 22 via the left-hand aperture in plate 24. In this fashion, by manipulating a plate 24 having only a single incoming aperture and a single return aperture, the entire sample can be scanned and an image constructed.

Figure 7:
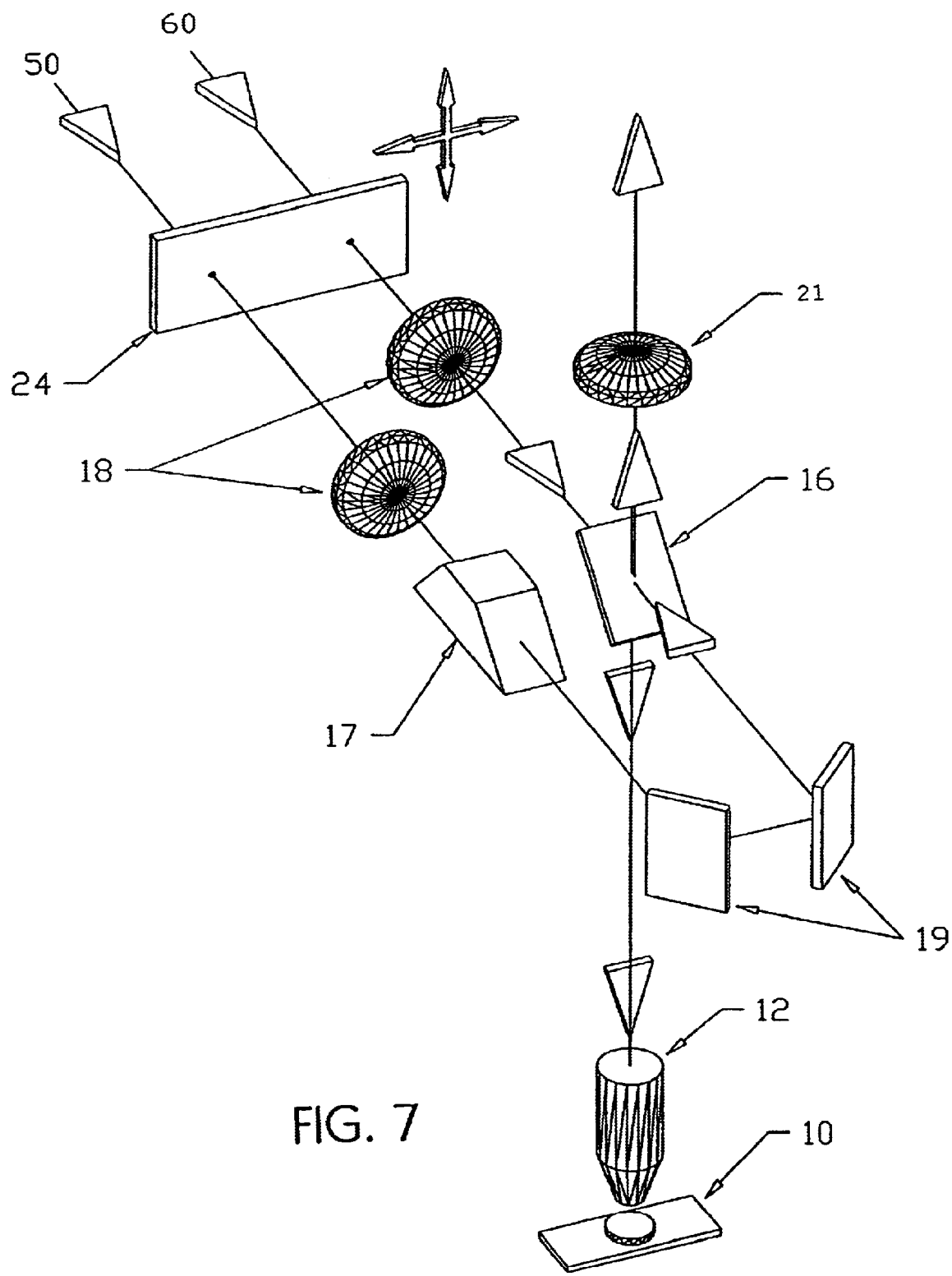
FIG. 7 is a schematic representation of a sixth embodiment of the present invention having a translatable aperture plate disposed in the incoming light path and including two distinct light sources: a visible light source for targeting a region of the sample to be illuminated, and a second, invisible light source (such as a UV or IR light source) for illuminating the targeted region of the sample.

Moreover, this embodiment of the invention can be altered slightly to provide a mechanism by which a secondary, targeting beam of visible or photodetectable light can be used to target the area which is to be scanned or photoactivated by a primary, excitation beam. This sixth embodiment of the invention is depicted in FIG. 7. Here, the device uses two light sources (not shown), such as a visible targeting source to generate targeting light path 50 and an invisible UV or IR source to generate excitation light path 60.

Light in the targeting light path 50 passes through the left-hand aperture in aperture plate 24. The plate 24 is translatable in the same fashion as the embodiment shown in FIG. 6. The targeting light path 50 passes through pupil lens 18, dove prism 17, and is directed via mirrors 19 to a dichroic mirror or beam-splitter 16 (hereinafter referred to as the dichroic mirror). The dove prism is included to provide proper XY orientation when viewing the targeting light through either an eyepiece or via a camera. The Fresnel reflection from the uncoated back surface of the dichroic mirror 16 is directed upward through the tube lens 21 and may then be directed to a video camera, a still camera or a microscope eyepiece (monocular or binocular) where it forms a detectable spot in the field of view.

Light from the primary source follows the excitation light path 60. The excitation light path 60 is directed through the right-hand aperture of plate 24, passes through pupil lens 18, is reflected downward by dichroic mirror 16, passes through objective lens 12 to the sample 10. Because of the optically-coupled nature of the targeting light path 50 and the excitation light path 60, the targeting light path forms a detectable spot within the field of view that is superimposed upon the same exact location where the excitation light path falls on the sample 10. Also, because the two light paths, 50 and 60, are optically coupled, the targeting light path 50 exactly tracks the excitation light path 60 when the plate 24 is translated to scan the sample. Thus, the targeting light path 50 indicates where on the sample the focused spot from the excitation light path 60 will fall within the field of view. This is extremely beneficial when performing fluorescence spectroscopy because the desired area to be excited can be precisely targeted, a priori. Once the desired area is located visibly using the targeting light path 50, the excitation light path 60 can be activated and the fluorescence measurements taken at the exact desired location within the sample 10.

In the embodiment shown in FIG. 7, the device may either be used in a confocal manner (the other required confocal sub-assemblies are not shown in FIG. 7 for purposes of clearly depicting the two light paths) or the device may be used simply as a direct view microscope.

Figure 8:
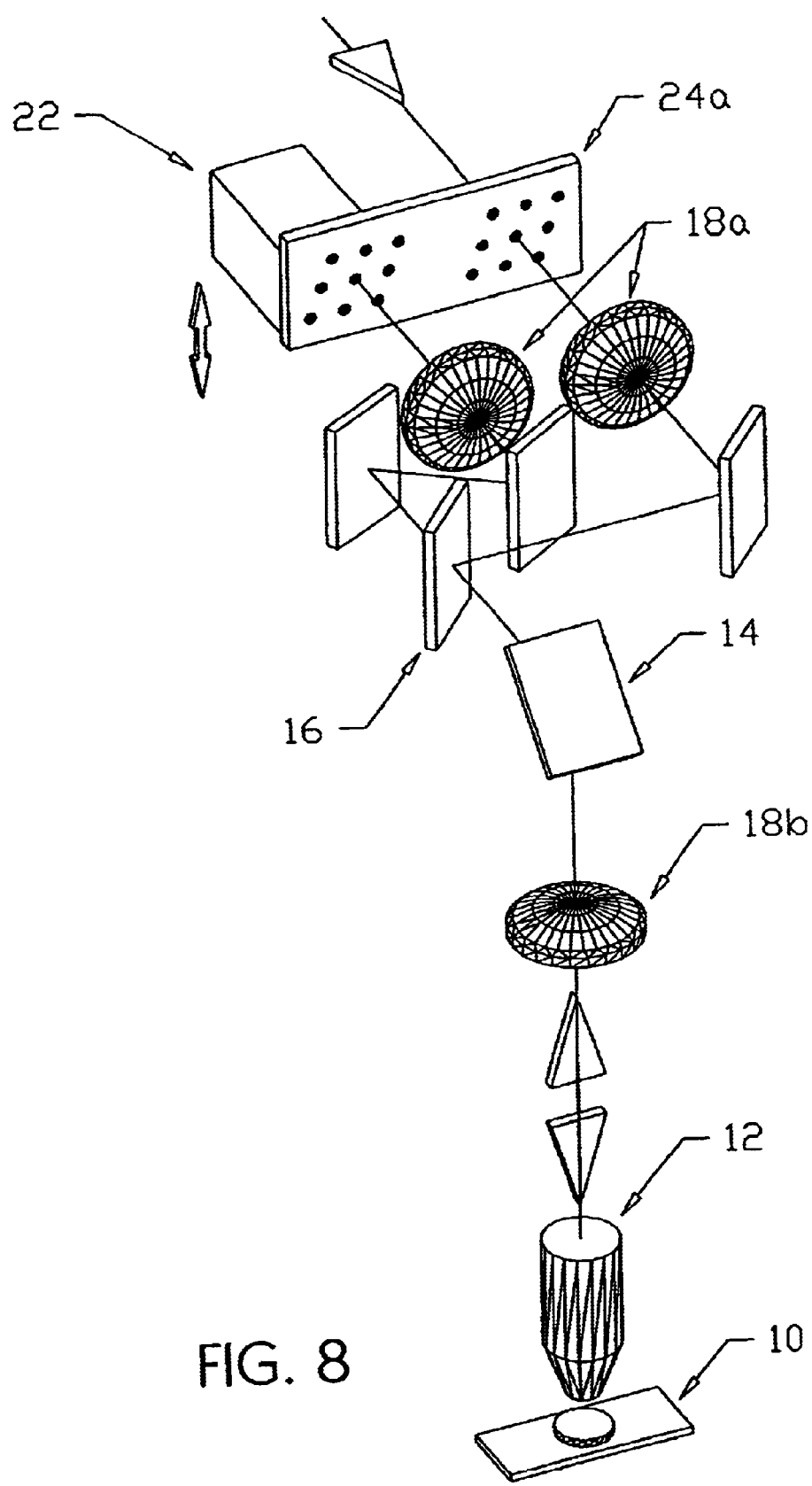
FIG. 8 is a schematic representation of a seventh embodiment of the present invention having a translatable aperture plate including a paired set of aperture arrays.

FIG. 8 illustrates a still further embodiment of the present invention. Here, a translatable aperture plate 24a is provided, the plate having two sets of aperture arrays disposed therein. By translating the plate (using means shown in FIG. 6), a scanned image of sample 10 can be quickly generated. As shown in FIG. 8, the aperture plate 24a is controlled in such a fashion that the incoming light is swept as a multitude of spots across the surface of the sample 10. As shown in the figure, the input light passes through the right-hand aperture array of plate 24a, through lens(es) 18a and is directed to the surface of the sample 10 via mirror 14, lens 18b, and objective lens 12. The returning image is simultaneously de-scanned via the left-hand array of apertures on the same plate 24a. By translating the aperture plate 24a in a controlled fashion, the incoming light path can be simultaneously scanned across the sample 10 via the right-hand aperture array in plate 24a, while the return light path is simultaneously de-scanned prior to impinging upon the detector 22 via the left-hand aperture array in plate 24a. Thus by translating the plate 24a in the X and/or Y planes, the entire sample can be scanned very quickly and an image constructed.

FIG. 9 illustrates yet another embodiment of the present invention. The embodiment illustrated in FIG. 9 is similar to that shown in FIG. 8, with the exception that the aperture plate, 24b, contains multiple sets of aperture arrays. The different arrays can be brought into the light path to suit different conditions (such as different magnifications, different types of samples, different types of illumination sources, etc.). Thus, as shown in FIG. 9, the lower two aperture arrays disposed in aperture plate 24*b* are being used. The incoming light path is spatially filtered through the lower, right-hand aperture array in the aperture plate 24*b*, and is then directed to the sample 10 via lens 18', dichroic mirror or beam-splitter 16, galvanometer-controlled mirror 21, lens 18, and objective lens 12.

The return light path is then directed in reverse along the same path back to beam splitter or dichroic mirror 16, then through the lower, left-hand aperture array in the aperture plate 24*b*, where it is spatially filtered. After passing through the lower, left-hand aperture array in the aperture plate 24*b*, the return light path is directed to the photodetector 22 via lens 18" and galvanometer-controlled mirror 21'. By rotating the two galvanometer-controlled mirrors 21 and 21' in unison, the entire sample can quickly be scanned and an image assembled.

The various lenses and sub-assemblies described herein, specifically the objective lens (or lenses) 12, the transfer lens (or lenses) 14, the galvanometer-driven mirror(s) 16 and 16', the transfer lens (or lenses) 18, the dichroic mirror(s) 22, the beam-splitter sub-assembly 22*a*, and the image transfer lens (or lenses) 24, are all depicted in the schematics as single lenses. This may or may not be the case and is only used in the drawings for brevity and clarity. Each "lens," "mirror," and "beam-splitter" as such, may comprise any number of lenses and/or mirrors to accomplish the goal of moving the light path from the input source to the sample and returning the reflected light to the photodetector 26. Thus, where appropriate, these structures are reference in terms of the functional result to be obtained. Thus, for example, the term "beam splitting means" refers to any structure, such as a dichroic mirror or suitable lens or lenses, or any combination of lenses or mirrors to accomplish the functional goal of splitting a parent light beam into two distinct daughter light beams.

Lenses, mirrors, galvanometers, acoustical-optical devices, beam-splitters, and the like, suitable for use in the present invention, may be obtained from any number of commercial suppliers. For example, suitable optical components can be obtained from GSI Lumonics (Billerica, Mass.), JML Direct Optics (Rochester, N.Y.), and Chroma Technologies (Brattleboro, Vt.).

The photodetector used in the invention may be any type of detector now known or developed in the future for processing light (i.e., electromagnetic radiation, including UV, IR, or x-ray) into images or digital data streams that can be further manipulated via computer. Included within this definition are digital cameras, film cameras, charge-coupled devices of any and all description, photomultiplier tubes, and single and multichannel photon detectors of any and all description. Collectively, these devices are referred to herein as photodetection means, a term which is synonymous with "means for photodetection." In short, the photodetection means used in the invention is not critical, so long as the chosen device functions to detect the particular wavelength of radiation used in the invention. Photodetection means suitable for use in the present invention can be obtained from numerous commercial suppliers, including Hamamatsu Corporation (Bridgewater, N.J.) and Roper Scientific (Trenton, N.J.).

Likewise, the light source used in the subject invention can be any type of light source that generates the desired wavelength of electromagnetic radiation. A laser light source is preferred. Suitable light sources are available commercially from suppliers such as Melles Griot (Carlsbad, Calif.) and Coherent Laser Group (Santa Clara, Calif.).

There are a great many advantages afforded by the present invention that are not available using conventional confocal microscopes. For example, using a galvanometer to sweep a confocal pinhole array allows increased image frame rate as compared to conventional raster-scanned confocal microscopy. Additionally, there are many means to deflect the light from the array other than galvanometer-controlled mirrors, such as acousto-optic deflectors, polygonal scanners, and the like, all of which are encompassed by the present invention. Thus, the invention provides flexibility in terms of cost, construction details, etc.

The configuration of the subject microscope allows the galvanometer-controlled mirrors to be positioned exactly at pupil planes in comparison to the slightly offset position required when using close-coupled galvanometer mirrors as in some conventional raster-scanned confocal microscopes. This improves input light uniformity at the sample as the scan proceeds across sample (i.e., because the mirror is positioned exactly at the pupil plane, there is no "pupil wander"). This arrangement also improves the return light transfer efficiency (again because the pupil image is not wandering in relation to the objective lens pupil during de-scanning). It also allows the input light beam to be reduced in diameter as compared to the objective pupil (less overfilling required) thus improving the power efficiency of the microscope. In short, it allows an equally clear image to be generated using a light source of reduced power output as compared to conventional confocal microscopes.

The various embodiments of the invention have advantages in given applications. For example, the embodiments depicted in FIGS. 2 and 5 share a single aperture array for both the incoming and return light path, while the embodiments depicted in FIGS. 3 and 4 feature dual or paired aperture arrays.

The shared aperture versions illustrated in FIGS. 2 and 5 use the same light path for both excitation and emission. This arrangement has the simplicity of a single optical pathway and is thus less costly to manufacture because there are less component parts required.

The paired aperture versions illustrated in FIGS. 3 and 4 gain the efficiency of having separate pathways as in conventional raster-scanned confocal systems. This efficiency gain is a result of having the detector located behind the output confocal apertures where it can be shielded from stray input light. Other advantages of the paired aperture version include: 1) the ability to vary the input and output apertures independently; 2) to use various diode, diffractive mechanisms, or fiber arrays directly as the input aperture; 3) to use fixed single and multi-channel detectors directly at the output aperture plane; and 4) to use fibers, waveguides, or other methods to transfer the output signal from the apertures to remote detectors.

Using a stationary array of apertures enables the use of an oscillation mechanism to enable "infinite" field illumination and sampling at the sample and the detector respectively. This is accomplished by translating the array a small distance during several successive scans, the distance corresponding to the "Y axis" spacing between adjacent aperture holes.

For instance, at a 30 Hz frame rate, if the horizontal scan is running at 200 Hz and the array is vibrated over the "Y axis" pinhole separation distance at 15 Hz, the image as viewed by the eye will appear without scan lines and in effect be infinitely sampled.

In a similar case, using a photosensitive array of detectors in place of the eye, the image will appear to be infinitely scanned, with the resolution of the image limited only by the detector element pitch.

Using a stationary aperture array or reflector pattern plate also enables the use of a variety of methods to deliver input light, including: fiber or waveguide coupling from remote sources, reflection cavity injection, microlens arrays, and diffractive elements, all of which are explicitly included within the scope of the invention. This list is illustrative, not exclusive. Any suitable means for delivering input light into the device can be used.

Likewise, using a stationary aperture array or reflector pattern enables a variety of methods to couple the output light to remote multi-channel detectors, including: fiber or waveguide coupling to remote detectors, optical relay of the output light to distant detector arrays such as multi channel photomultiplier tubes (PMTs) and microchannel plates, and microlens arrays.

Using a stationary aperture plate also permits the attachment of various single or multi-channel detectors directly behind or in place of the confocal emission apertures.

The stationary multi-aperture array also enables the use of an effective and inexpensive mechanism to translate the time domain information transmitted through the output apertures into a two-dimensional, spatially-mapped image of the sample. This mechanism uses a "re-scan" galvanometer, i.e., the galvanometer placed behind the apertures (see 16' in FIGS. 3 and 5), the "re-scan" galvanometer being synchronized with the input galvanometer (see 16 in FIGS. 3 and 5). This can either be the same galvanometer used for the input light or an additional galvanometer. Both approaches are encompassed in the subject invention. The optical system is designed to project an image of the aperture array onto the focal plane of a multi-channel detector array such as a CCD. Thus the re-scan galvanometer produces the mapping of the time domain information onto the horizontal axis of the detector array. The re-scan galvanometer can use a reflective, refractive, or diffractive element to produce the deflection. This very simple arrangement replaces expensive signal detection and synchronization electronics found in most raster confocal systems.

This arrangement also allows a wide variety of cameras to be coupled to the system. It also allows an eyepiece to be introduced at the focal plane, thus allowing the live-time image to be viewed directly with the eye.

One variation of the design allows it to be inserted into the infinity space of an upright microscope. In this configuration, switching between direct-view confocal image and the direct-view, full-field, non-confocal image becomes possible.

In similar fashion, the embodiments depicted in FIGS. 6 through 9, where the aperture plate is translatable in the X and Y plane, allow for the incoming light and the return light to be very quickly scanned and de-scanned, respectively. It also allows for a machine that is very compact and robust.

What is claimed:

1. A microscope comprising:
    a light source for emitting an incoming light beam with which a sample to be observed is irradiated, thereby generating a return light beam from the sample;
    a fixed and immovable aperture plate having an array of apertures defined therein,
    wherein the aperture plate is disposed in a position within the incoming light beam such that the incoming light beam is spatially filtered as it passes through the array of apertures; and
    a first means for scanning the spatially-filtered incoming light beam from the aperture plate across the sample and for de-scanning the return light beam from the sample so that the return light beam impinges on the aperture plate; and
    further comprising photodetection means disposed within the return light beam at a position capable of detecting the return light beam after it has passed through the array of apertures; and
    further comprising second means for scanning the return light beam, the second means disposed within the return light beam at a point after the return light beam has passed through the array of apertures, but prior to the return light beam reaching the photodetection means.

2. The microscope of claim 1, wherein the second means for scanning is selected from the group consisting of a galvanometer-controlled mirror, an acousto-optical deflector, a polygonal scanner, a diffraction grating, and a microelectromechanical system.

3. A microscope comprising:
    a light source for emitting an incoming light beam with which a sample to be observed is irradiated, thereby generating a return light beam from the sample;
    a fixed and immovable aperture plate having an array of apertures defined therein,
    wherein the aperture plate is disposed in a position within the incoming light beam such that the incoming light beam is spatially filtered as it passes through the array of apertures;
    a first means for scanning the spatially-filtered incoming light beam from the aperture plate across the sample and for de-scanning the return light beam from the sample so that the return light beam impinges on the aperture plate;
    wherein the fixed aperture plate has at least two distinct arrays of apertures defined therein; wherein a first of the arrays of apertures is disposed in a fixed position within the incoming light beam such that the incoming light beam is spatially filtered as it passes through the first array of apertures; and wherein a second of the arrays of apertures is disposed in a fixed position within the return light beam such that the return light beam is spatially filtered as it passes through the second array of apertures;
    photodetection means disposed within the return light beam at a position capable of detecting the return light beam after it has passed through the second array of apertures; and
    second means for scanning the return light beam, the second means disposed within the return light beam at a point after the return light beam has passed through the second array of apertures, but prior to the return light beam reaching the photodetection means.

4. The microscope of claim 3, wherein the first means for scanning and the second means for scanning are independently selected from the group consisting of a galvanometer-controlled mirror, an acousto-optical deflector, a polygonal scanner, a diffraction grating, and a microelectromechanical system.

5. The microscope of claim 3, wherein the photodetection means is disposed within the return light beam at a position directly behind the second array of apertures.

* * * * *